US006142180A

United States Patent [19]

Woodling et al.

[11] Patent Number: 6,142,180

[45] Date of Patent: Nov. 7, 2000

[54] CRANE-MOUNTED CONCRETE PUMP APPARATUS

[76] Inventors: Roger M. Woodling, 6106 S. 102nd Ter., Omaha, Nebr. 68127; Anthony E. Bond, 847 N. 68th St., Omaha, Nebr. 68132

[21] Appl. No.: 09/548,103

[22] Filed: Apr. 12, 2000

[51] Int. Cl.[7] .......... B65G 53/32

[52] U.S. Cl. .......... 137/615; 141/387

[58] Field of Search .......... 137/615, 899; 141/387, 388

[56] References Cited

U.S. PATENT DOCUMENTS

| | | | |
|---|---|---|---|
| 3,707,990 | 1/1973 | Schaible et al. | 137/615 |
| 3,893,480 | 7/1975 | Dunbar | 137/615 |
| 4,262,696 | 4/1981 | Oury | 137/615 |
| 4,502,505 | 3/1985 | Moller | 137/615 |
| 5,558,118 | 9/1996 | Mooring | 137/342 |
| 5,823,218 | 10/1998 | Schlecht et al. | 137/615 X |
| 5,913,323 | 6/1999 | Hudelmaier | 137/615 X |

*Primary Examiner*—Kevin Lee
*Attorney, Agent, or Firm*—Zarley, McKee, Thomte, Voorhees & Sease; Dennis L. Thomte

[57] ABSTRACT

A crane-mounted concrete pumper has been provided wherein a telescoping boom assembly is pivotally and rotatably mounted on the platform of the truck. A concrete conduit is positioned in the interior of the boom assembly and has its intake end operatively connected to a concrete pump mounted on the truck by means of a flexible concrete hose. An extension boom is pivotally mounted on the boom assembly and may be pivoted from a folded, inoperative position to an extended position. A concrete conduit is provided in the interior of the extension boom and is placed into communication with the concrete conduit in the boom assembly when the extension boom is in its extended position. The crane may be either used to pump concrete or used in a conventional fashion. An aerial platform is provided on the boom assembly to enable an operator to pump or spray concrete.

19 Claims, 14 Drawing Sheets

CRANE-MOUNTED CONCRETE PUMP APPARATUS

BACKGROUND OF THE INVENTION

1. Field of the Invention

This invention relates to a concrete pump apparatus and more particularly to a concrete pump apparatus which is mounted on a truck crane.

2. Description of the Related Art

Concrete is sometimes pumped to locations where it is difficult or impossible for a concrete mixer truck to gain access thereto. Such is the case where concrete is to be poured behind a house or the like where it is impossible to drive the concrete mixer truck. One alternative to such a situation is to use wheelbarrows to transport the concrete to the location where it is to be placed. Another solution has been to utilize a telescoping boom assembly which is mounted on a truck. In some cases, a concrete pump is positioned on the truck and a concrete conduit, such as a flexible hose, is extended from the pump, along the length of the telescoping boom, at the exterior surface thereof, to a discharge conduit from which the concrete is discharged. The telescoping boom is extended and maneuvered to position the discharge conduit at the proper location. Although concrete pumpers of the type described do work quite satisfactorily, the telescoping boom assembly has no use other than for pumping concrete. In other words, the telescoping boom assembly cannot be used as a crane during those times when concrete is not being pumped. If the boom assembly does not have an aerial platform thereon, it is impossible for an operator to be therein for pumping and spraying concrete. Usually, the spraying of concrete is called shotcrete. Shotcrete is the spraying of concrete on wire mesh for texturing surfaces similar to stucco. If one does not have an aerial lift, then the person must walk on scaffolding and manhandle the hose to shotcrete. To the best of applicants' knowledge, the instant invention is the only aerial lift unit that allows a person to pump concrete from the aerial platform.

SUMMARY OF THE INVENTION

A crane-mounted concrete pump apparatus is provided with the apparatus being mounted on a truck having a rotatable pedestal assembly mounted thereon rearwardly of the cab of the truck. A telescoping boom assembly is pivotally secured to the pedestal and extends outwardly and normally upwardly therefrom. A hydraulic cylinder pivotally connects the telescoping boom assembly to the pedestal for pivotally moving the telescoping boom assembly with respect to the pedestal. The telescoping boom assembly preferably comprises an outer boom section, an intermediate boom section slidably mounted in the interior of the outer boom section, and an inner boom section slidably mounted in the interior of the intermediate boom section.

A concrete conduit is positioned in the interior of the boom assembly and has an intake end positioned adjacent the rearward end of the boom assembly and a discharge end positioned at the outer end of the boom assembly. A concrete pump is mounted on the truck and is operatively connected to the intake end of the concrete conduit by means of a flexible hose or tube for supplying concrete to the concrete conduit. The outer end of the boom assembly has conventional crane attachments mounted thereon such as hoist cable pulleys, aerial platform, etc., so that the apparatus may be used as a conventional crane when the apparatus is not being used to pump concrete. The provision of the aerial platform on the outer end of the boom assembly also permits an operator to spray or pump concrete from the platform. An elongated extension boom section is pivotally mounted at the side of the boom assembly and may be pivotally moved from an inoperative stored position to an extension position wherein one end of the extension boom is in abutting relationship with the outer end of the boom assembly with the longitudinal axis of the extension boom being parallel to the longitudinal axis of the boom assembly. The concrete conduit is positioned in the interior of the extension boom and has an intake end in communication with the discharge end of the concrete conduit in the boom assembly and has a discharge end positioned at the outer end of the extension boom so that concrete may be placed considerable distances from the truck or at considerable heights above the truck.

It is therefore a principal object of the invention to provide an improved concrete pumping apparatus.

A further object of the invention is to provide a crane-mounted concrete pump apparatus.

Still another object of the invention is to provide a crane-mounted concrete pump apparatus wherein the telescoping boom assembly thereof may be used as a crane during those times when concrete is not being pumped.

Yet another object of the invention is to provide a crane-mounted concrete pump apparatus wherein an aerial platform is provided on the boom assembly to enable an operator to pump or spray concrete from the aerial platform.

Still another object of the invention is to provide a crane-mounted concrete pump apparatus wherein the concrete conduit is positioned within the interior of a telescoping boom assembly.

Still another object of the invention is to provide a crane-mounted concrete pump apparatus including an extension boom which may be stored in a folded position adjacent the side of the telescoping boom assembly thereof when the extension is not needed, but which may be pivotally moved to a position wherein it forms an extension of the telescoping boom assembly.

These and other objects will be apparent to those skilled in the art.

DESCRIPTION OF THE PREFERRED EMBODIMENT

Figure 2:
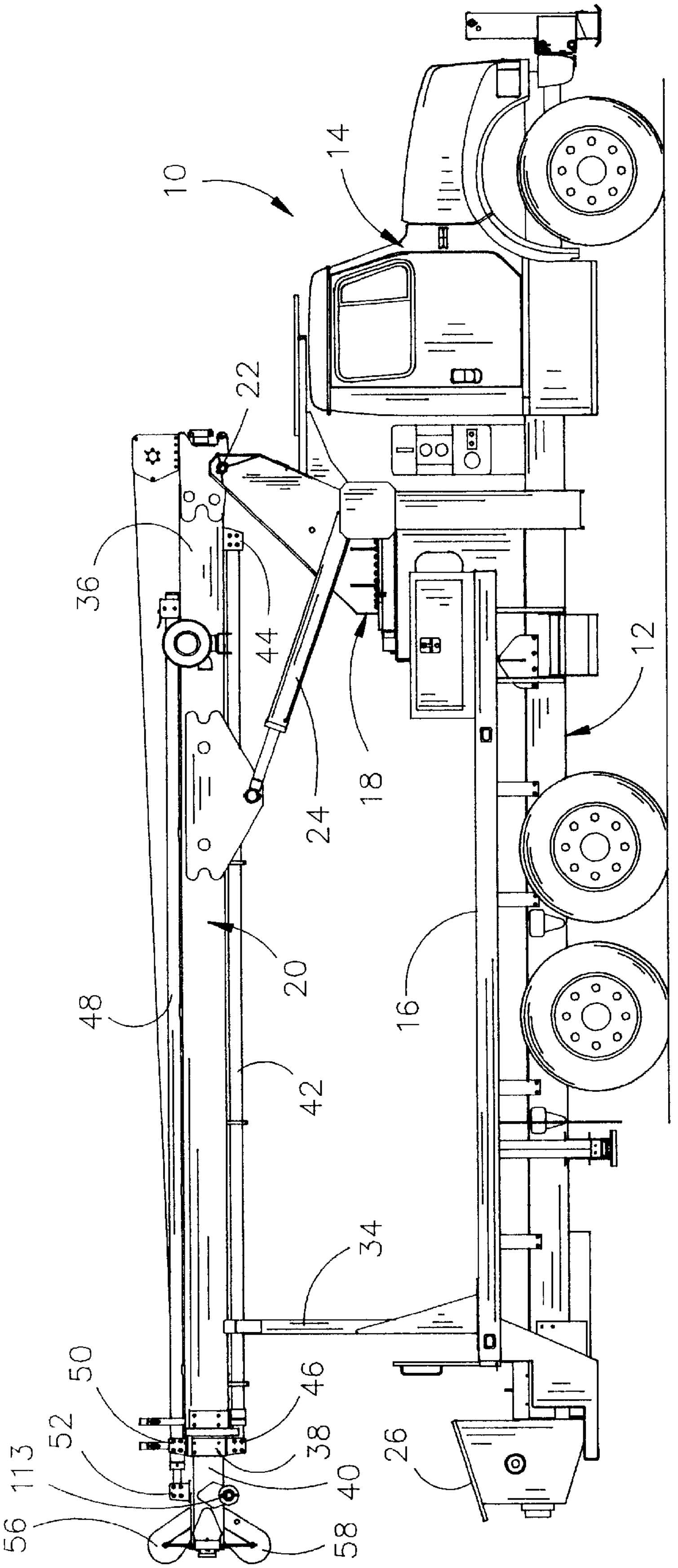
FIG. 2 is a side view of the apparatus of this invention the boom assembly thereof being in its retracted and folded position.
Figure 3:
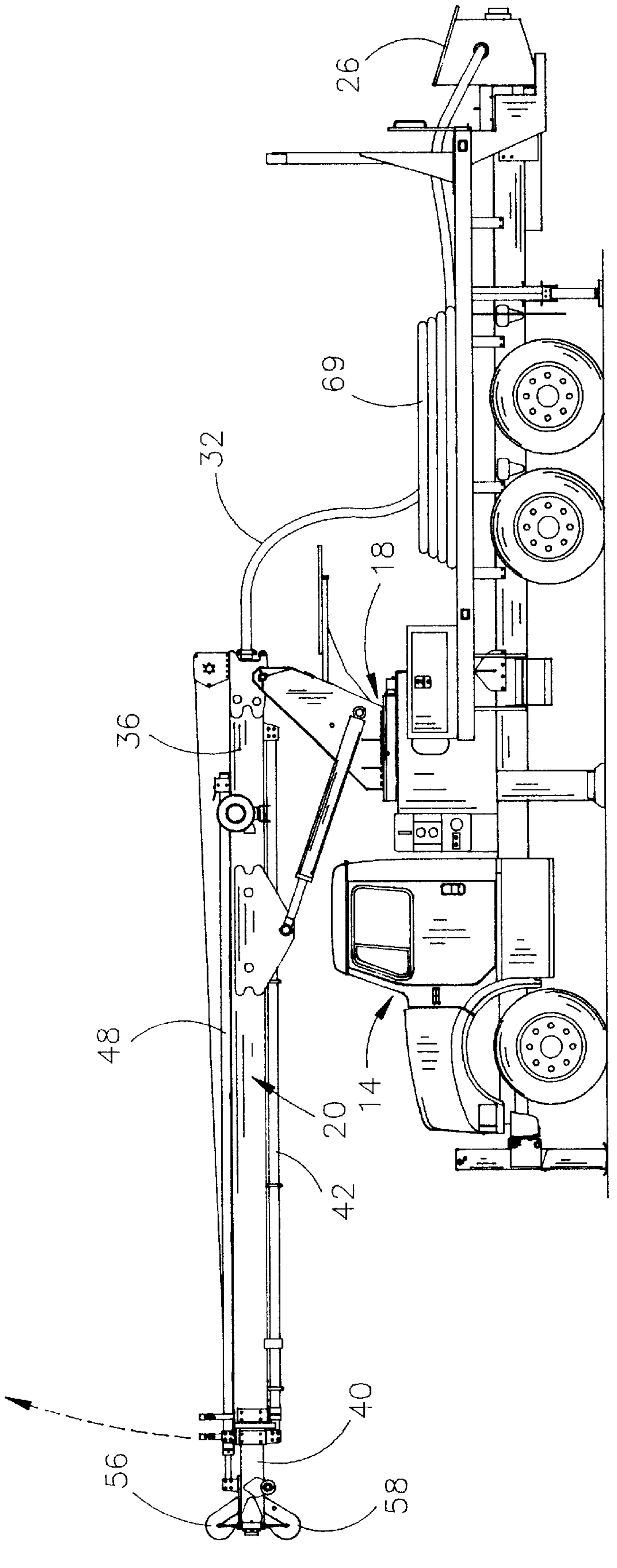
FIG. 3 is a side view of the apparatus of FIG. 2 taken from the left side of the vehicle illustrating the boom assembly thereof pointing forwardly of the truck.
Figure 4:
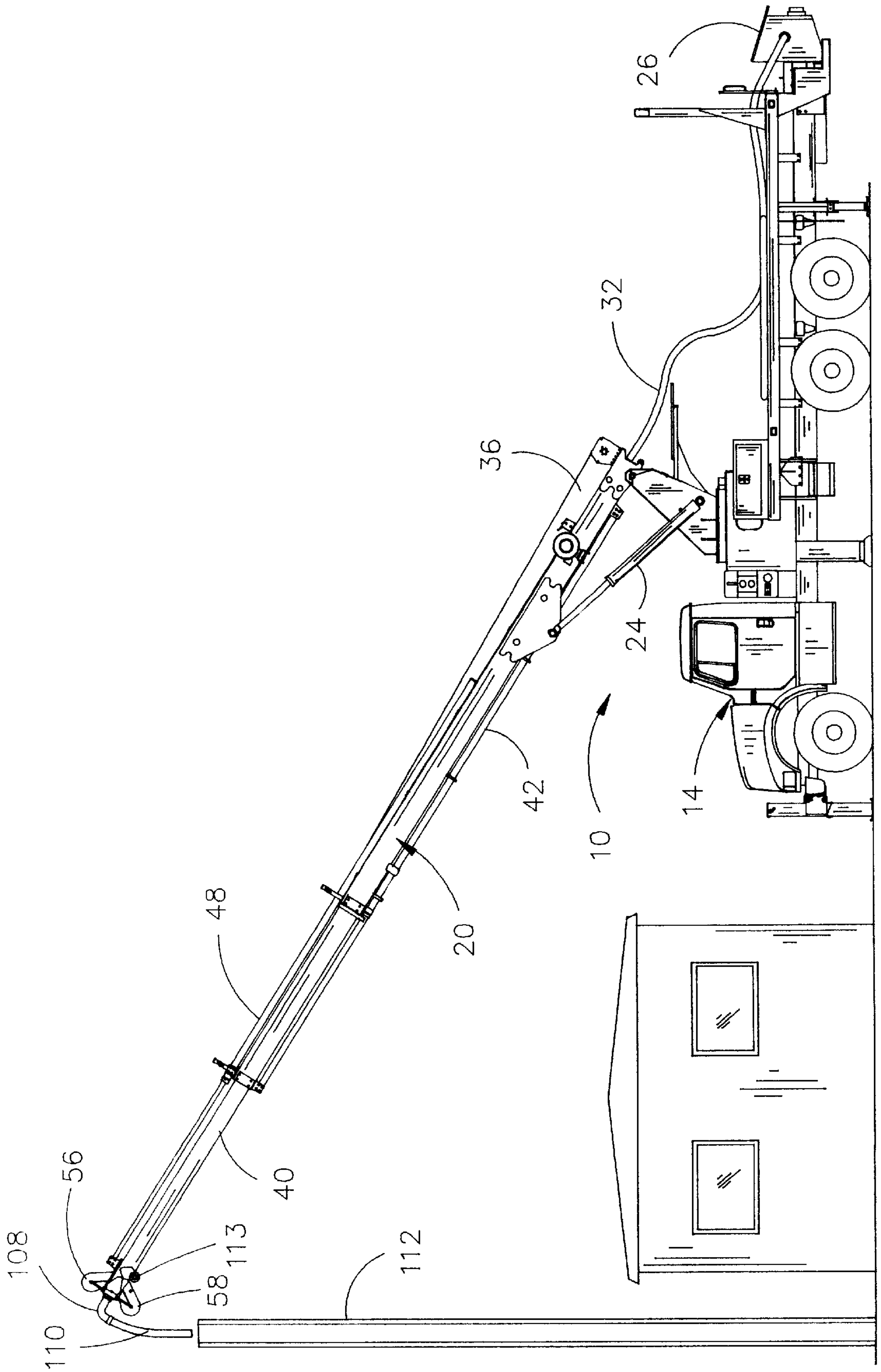
FIG. 4 is a side view similar to FIG. 3 illustrating the telescoping boom assembly having been raised and extended from the position of FIG. 3 to enable concrete to be pumped to the upper end of a concrete form.

The numeral 10 refers to a truck including a wheeled frame means 12 and a cab 14 mounted at the forward end thereof. Platform 16 is provided at the rearward end of the truck 10 which is positioned rearwardly of conventional crane pedestal 18 which is rotatably mounted on the truck in conventional fashion. The numeral 20 refers generally to the a telescoping boom assembly which is pivotally mounted at the upper end of the pedestal 18 at 22 and which has a hydraulic cylinder 24 extending therebetween for pivotally moving the boom assembly 20 relative to the pedestal 18. A conventional concrete pump 26 is mounted at the rear end of the truck and has a discharge conduit 28 extending therefrom. Concrete pump 26 includes a pivotal lid which is opened so that concrete may be supplied to the interior of the pump 26 in conventional fashion. The numeral 32 refers to a flexible hose or tube having one end thereof operatively connected to the discharge conduit 28 of the concrete pump 26. Boom assembly 20 rests upon support 34 in conventional fashion when the boom assembly 20 is in its lowered position as illustrated in FIG. 2.

Boom assembly 20 includes an outer boom section 36, the rearward end of which is operatively pivotally secured to the pedestal 18 at 22, an intermediate boom section 38 slidably received by the outer end of boom section 36, and an inner boom section 40 which is slidably received by the outer end of the intermediate boom section 38. While the invention preferably includes an outer boom section, an intermediate boom section, and an inner boom section, more or less boom sections could be utilized, depending upon the needs of the particular owner.

Hydraulic cylinder 42 has its rear end secured to the underside of outer boom section 36 at 44 and has its rod end secured to intermediate boom section 38 at 46. The body of hydraulic cylinder 48 is secured to intermediate boom section 38 at 50 and has its rod end connected to inner boom section 40 at 52. The body of the hydraulic cylinder 48, rearwardly of connection 50, slidably rests upon supports 54 which are secured to the upper surface of outer boom section 36 to enable the body of the hydraulic cylinder 48 to slidably move outwardly with respect to outer boom section 38 as intermediate boom section 38 is extended with respect to outer boom section 36. When cylinder 42 is extended, intermediate boom section 38 slidably moves outwardly with respect to outer boom section 36. The outward movement of intermediate boom section 38 with respect to outer boom section 36 also inner boom section 40 to move outwardly with intermediate boom section 38. If it is desired to extend inner boom section 40 with respect to intermediate boom section 38, hydraulic cylinder 48 is extended which causes inner boom section 40 to move outwardly with respect to intermediate boom section 38. During the extension of inner boom section 40 from intermediate boom section 38, the body of the hydraulic cylinder 48 slidably moves on the supports 54 as previously described. The outer end of inner boom section 40 is provided with conventional hoist cable mechanisms 56 and 58 to enable the apparatus to be used as a conventional crane when concrete is not being pumped. A basket or aerial platform 60 may be pivotally secured to the outer end of inner boom 40 at 113 to enable the apparatus to be used in conventional fashion should a basket be required to lift personnel to a desired location. The aerial platform 60 also enables an operator to be positioned therein to enable the operator to pump or spray concrete from the hose 110.

Figure 5A:
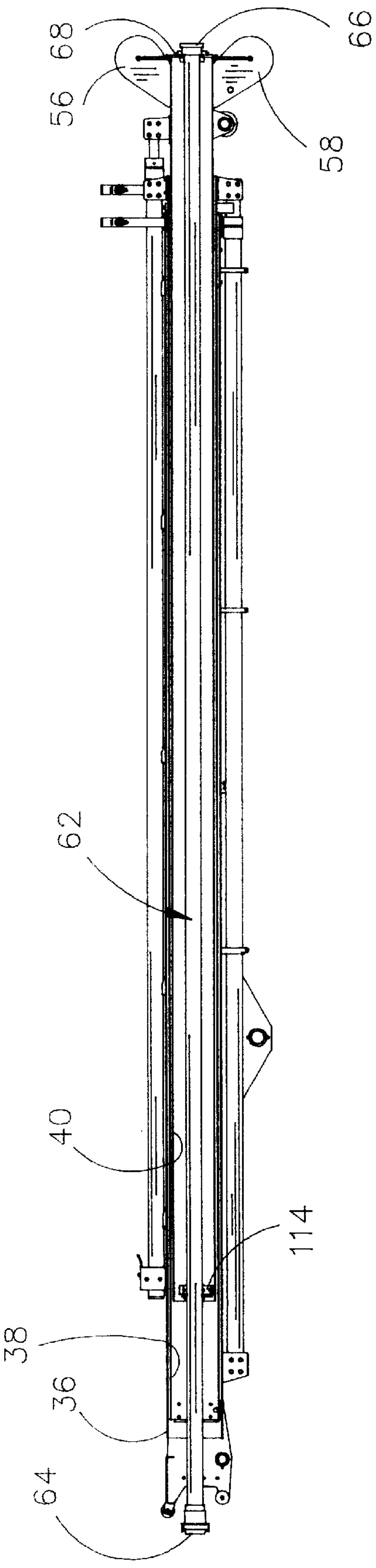
FIG. 5A is a side longitudinal sectional view of the boom assembly in its retracted position.
Figure 5B:
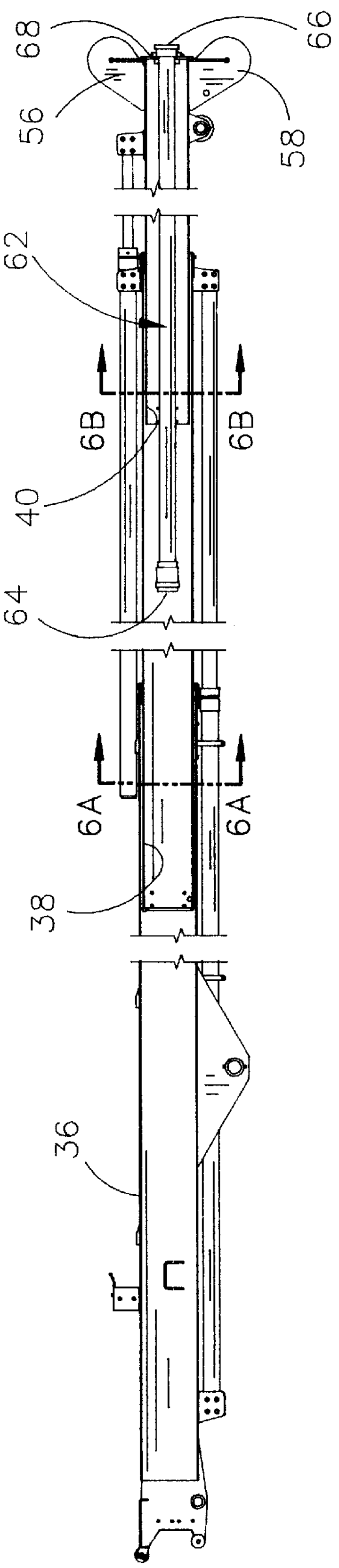
FIG. 5B is a view similar to FIG. 5A except that the intermediate and inner boom sections have been moved towards their extended positions.
Figure 6B:
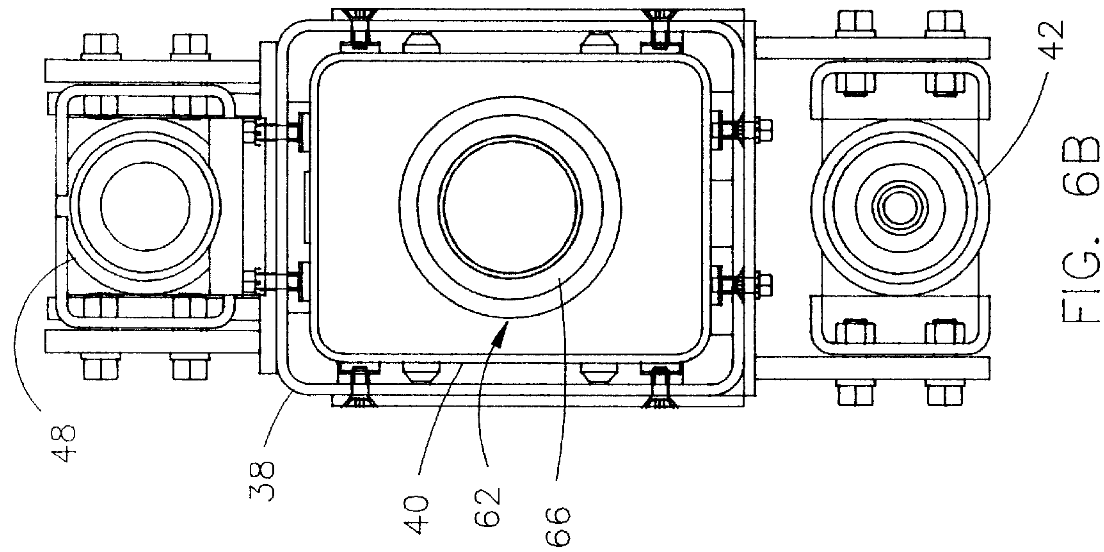
FIG. 6B is a sectional view as seen on lines 6B—6B of FIG. 5B.
Figure 6A:
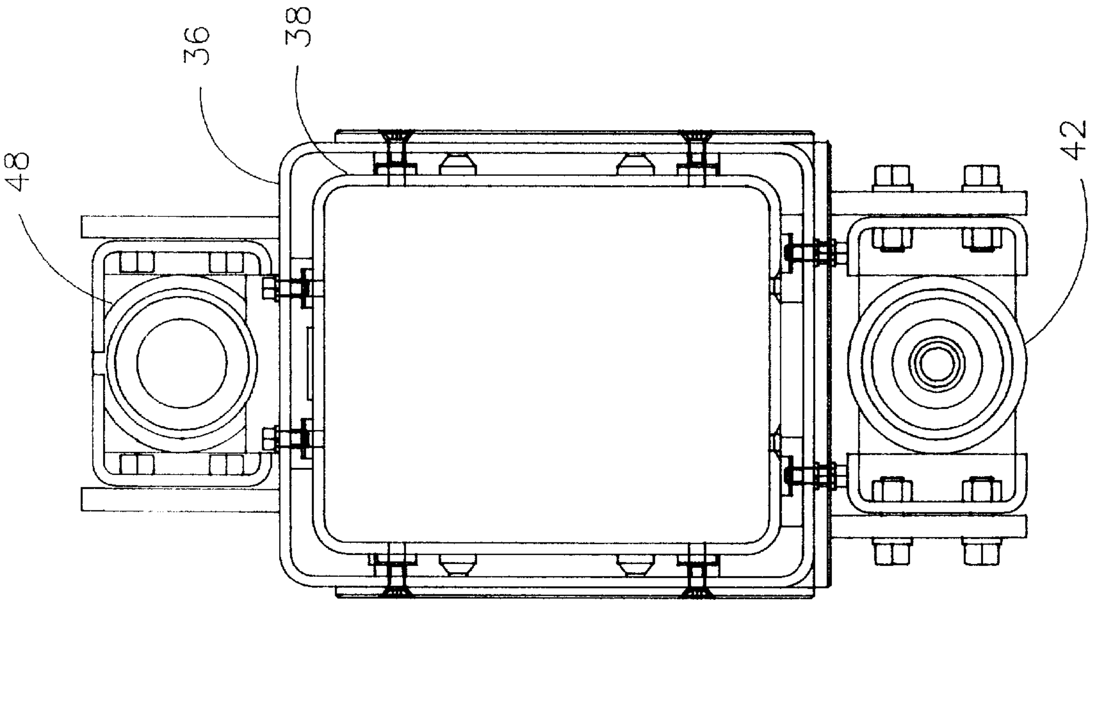
FIG. 6A is a sectional view as seen on lines 6A—6A of FIG. 5B.
Figure 7:
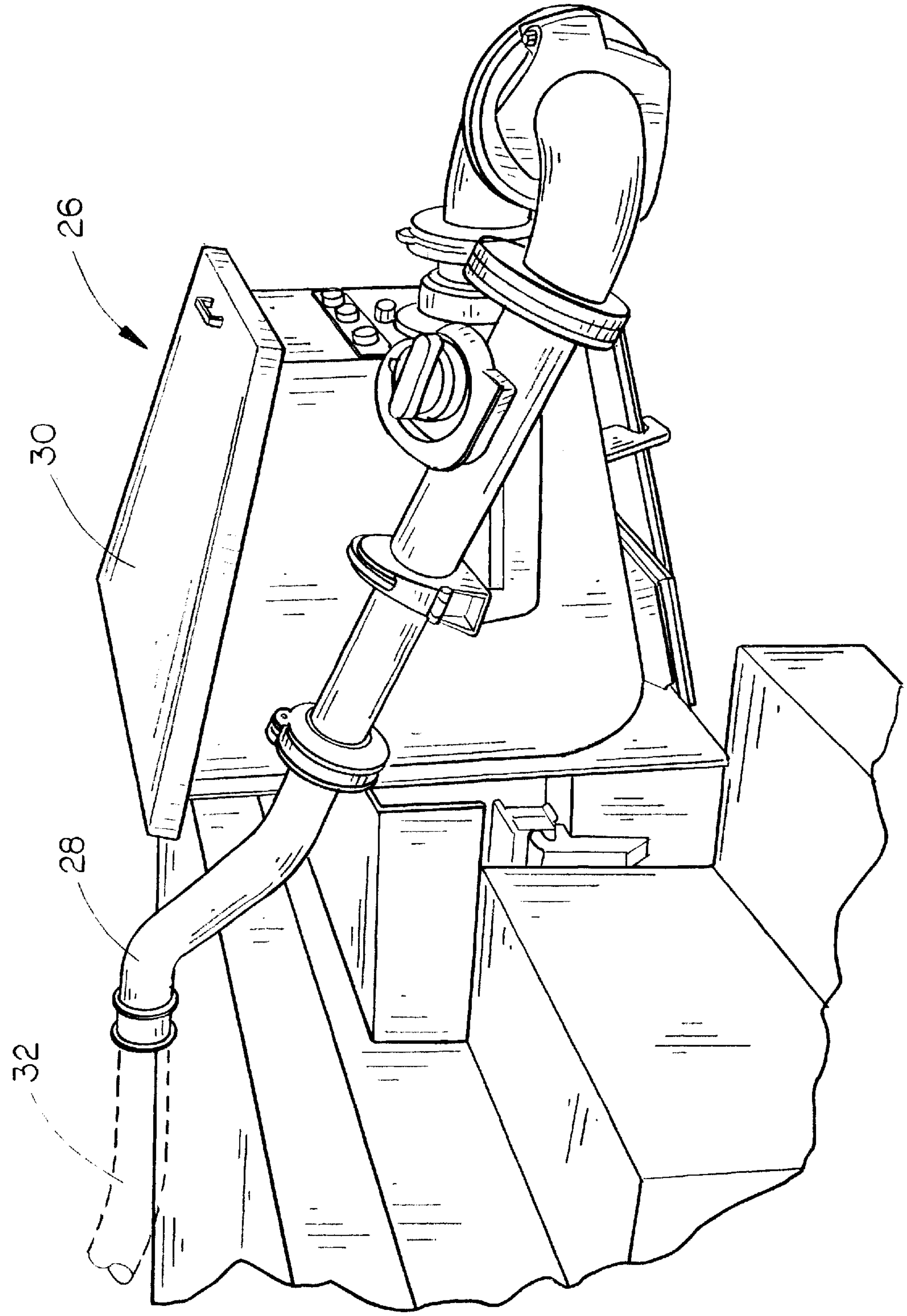
FIG. 7 is a partial rear perspective view of the concrete pump which is mounted at the rear of the truck.
Figure 8:
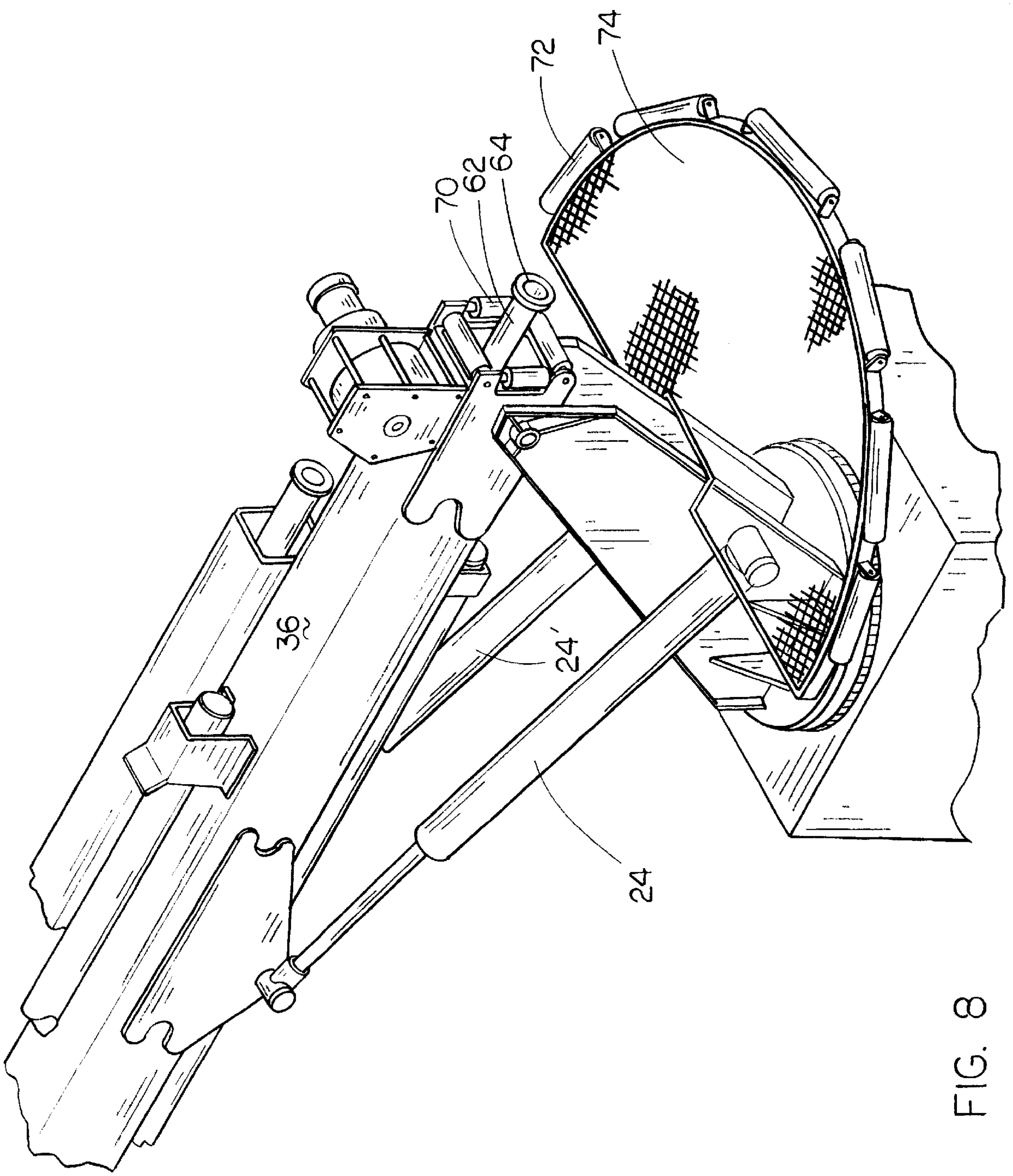
FIG. 8 is a partial rear perspective view of the boom assembly.

The numeral 62 refers to an elongated, preferably rigid, concrete conduit which extends through the interior of the boom assembly, as illustrated in FIG. 5A, and has its intake end 64 positioned rearwardly of the rearward end of outer boom section 36. The discharge end 66 of conduit 62 is positioned at the outer end of inner boom section 40 by means of support structures 68 and 114. Thus, extension of inner boom section 40 with respect to either intermediate boom section 38 or outer boom section 36 causes the intake end 64 of conduit 62 to move inwardly into the interior of the boom assembly. The discharge end of hose 32 is connected to the intake end 64 of conduit 62 to supply concrete to the interior of the conduit 62. As the intake end 64 of conduit 62 is moved inwardly into the boom assembly 20, the hose 32 is pulled inwardly into the interior of the boom assembly 20. For that reason, the hose 32 is initially wound into a coil referred to generally by the reference numeral 69 on the platform 16. As the hose 32 is pulled inwardly into the interior of the boom assembly 20, the hose 32 is pulled from the reel 69. To ensure that the hose 32 does not become damaged as it is being pulled into the interior of boom assembly 20, a plurality of rollers 70 are mounted at the inner end of the boom assembly 20, as seen in FIG. 8. Further, a plurality of rollers 72 are rotatably mounted on a semi-circular platform 74 so that the hose 32 may freely pass upwardly from the platform of the truck and into the interior of the boom assembly 20.

Figure 9:
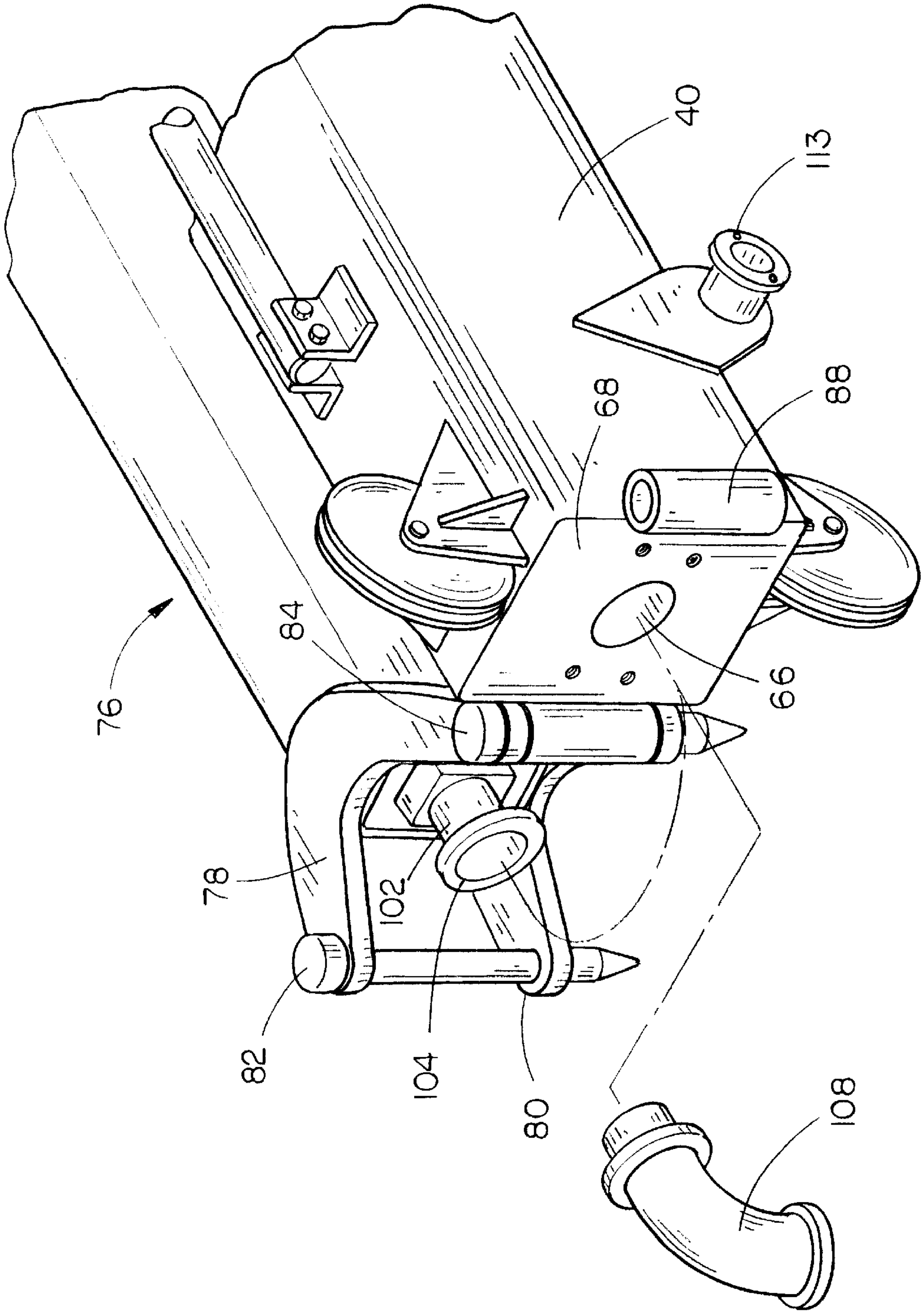
FIG. 9 is a partial front perspective view of the outer end of the boom assembly.

The numeral 76 refers to an elongated extension boom having yokes 78 and 80 secured to one end thereof, as seen in FIG. 9. Pins 82 and 84 are adapted to be extended downwardly through openings formed in the free ends of the yokes 78 and 80. As seen in FIG. 9, the forward end of inner boom section 40 has a pair of mounting collars 86 and 88 secured to the forward end thereof. When the boom 76 is in its extended position, pin 82 extends downwardly through yoke 78, collar 88, and through yoke 80 while pin 84 extends downwardly through yoke 78, collar 86, and yoke 80, as seen in FIG. 9, to secure one end of the extension boom 76 to the end of inner boom section 40. Extension boom 76 is provided with longitudinally extending, bullet-shaped arms 90 and 90' which are adapted to be received by receiver 92 secured to the side of intermediate boom section 38 adjacent the forward end thereof. Extension boom 76 is also provided a bullet-shaped arm 94 secured thereto which is adapted to be received by the receiver 96 which is secured to outer boom section 36 adjacent the rearward end thereof. Arm 94 has an opening 98 extending therethrough to enable pin 100 to be extended through receiver 96 and through the arm 94 to maintain arm 94 within receiver 96.

When extension boom 76 is to be pivotally moved to its folded position of FIG. 9, pin 82 is removed from yoke 78, collar 88, and yoke 80 so that boom 76 pivots about pin 84. When extension boom 76 is in its folded position, arm 94 is received by receiver 96 and secured thereto by pin 100 while arms 90 and 90' are received by the receiver 92. Inasmuch as arm 94 is pinned to receiver 96, extension of either intermediate boom section 38 and inner boom section 40 is prevented, since receiver 96 is secured to outer boom section 36. When boom 76 is in its folded and secured position, pin 84 is removed from yoke 78, collar 86, and yoke 80 so that booms 38 and 40 can extend and not interfere with extension boom 76 which is secured to main boom 36.

Figure 1:
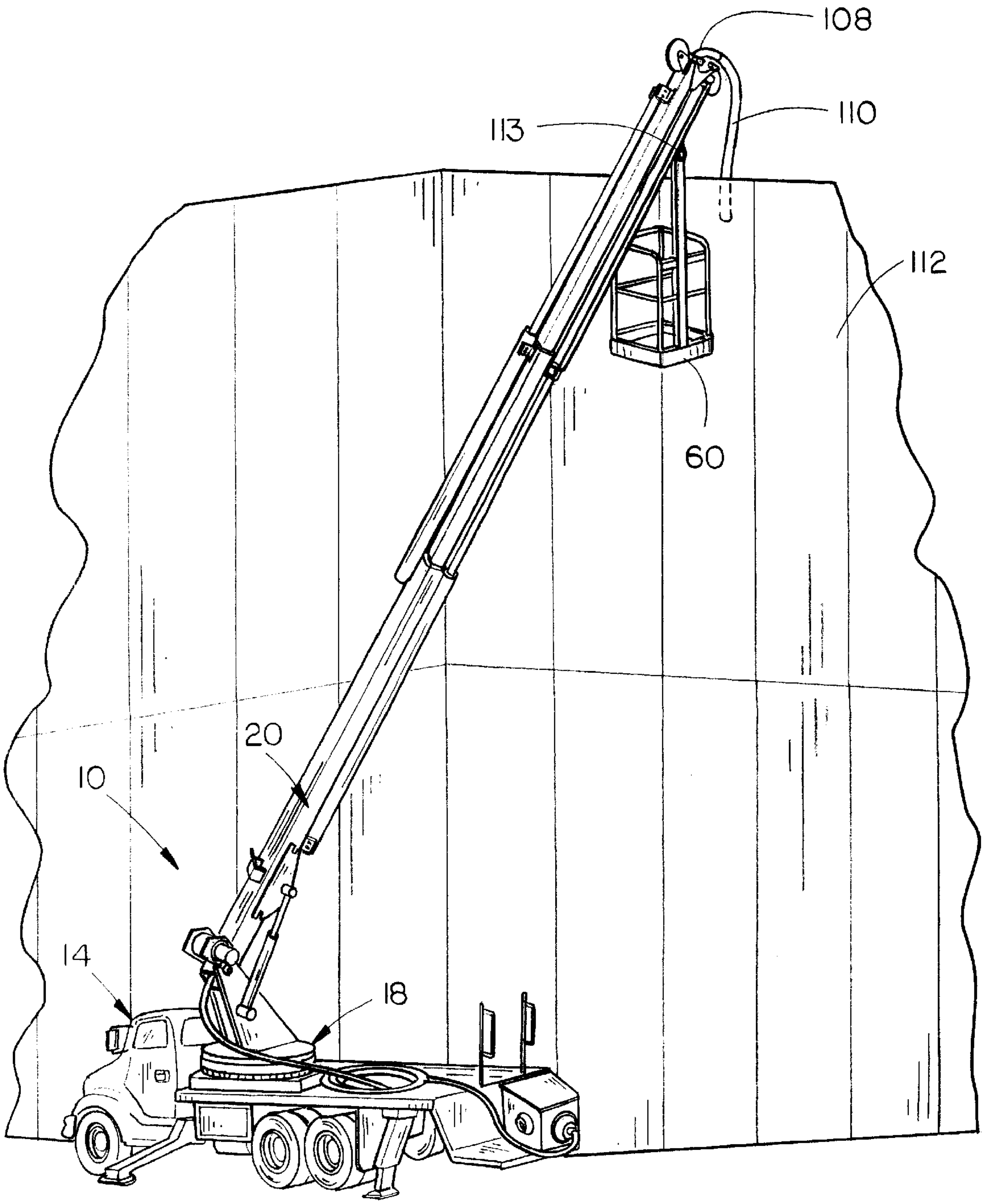
FIG. 1 is a perspective view illustrating the apparatus of this invention pumping concrete through the upper end of a vertical form.
Figure 10A:
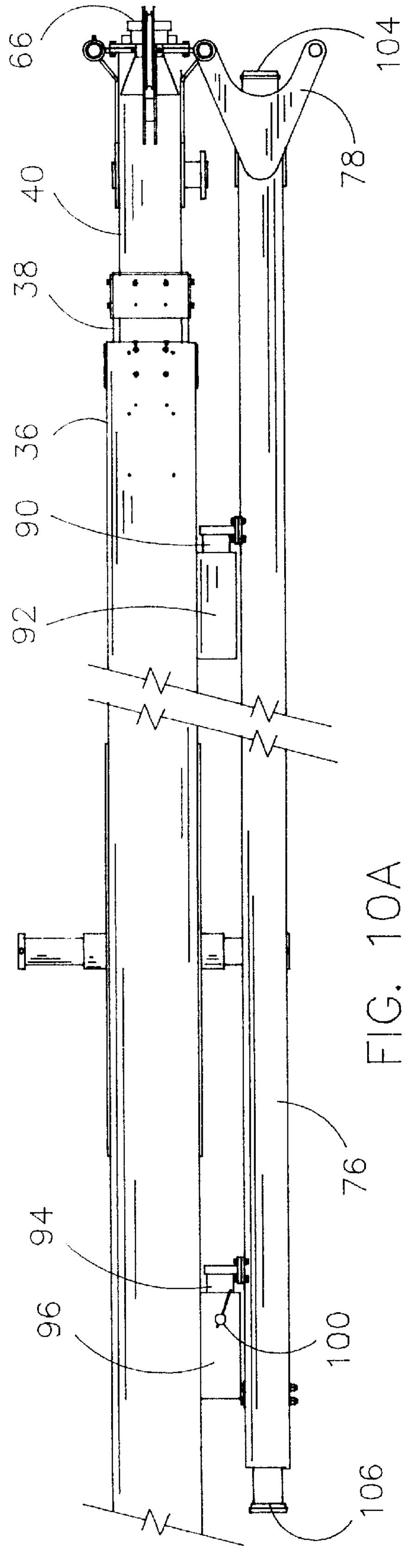
FIG. 10A is a partial top view of the boom assembly.
Figure 10B:
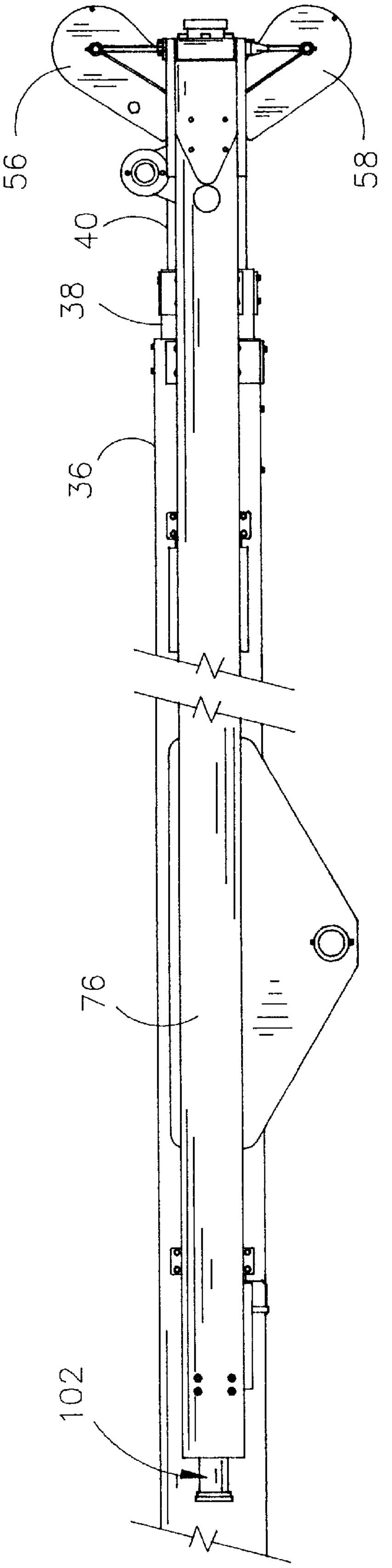
FIG. 10B is a partial side view of the boom assembly.
Figure 11A:
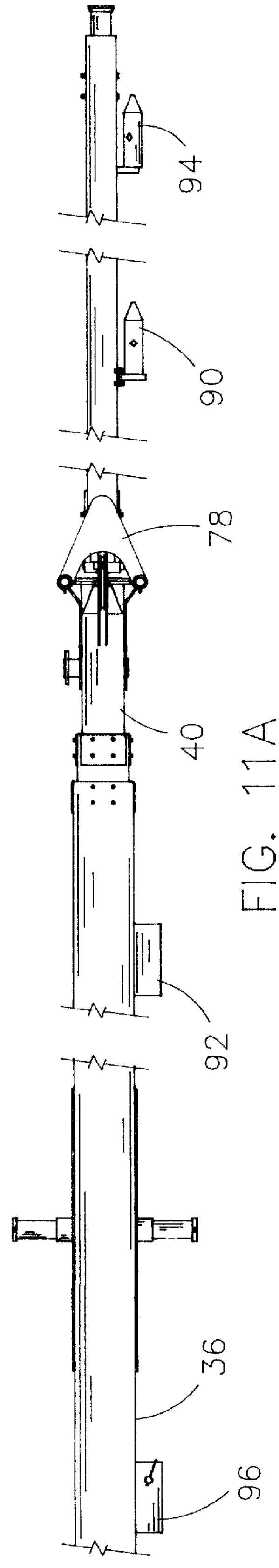
FIG. 11A is a view similar to FIG. 10A except that the extension boom has been pivoted from its folded position to its operative or extended position.
Figure 11B:
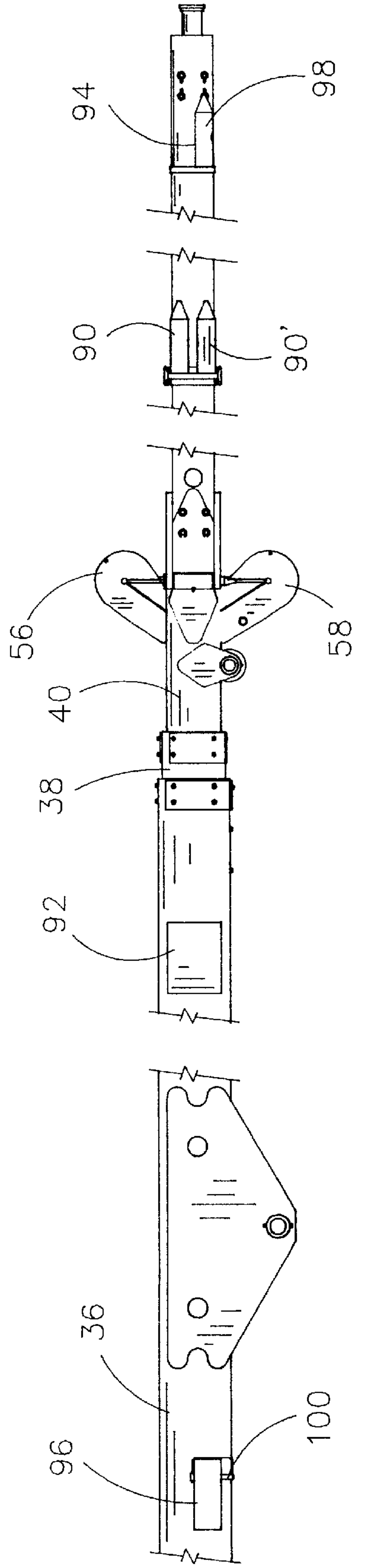
FIG. 11B is a view similar to FIG. 10B except that the extension boom section has been pivotally moved to its extended position.
Figure 12B:
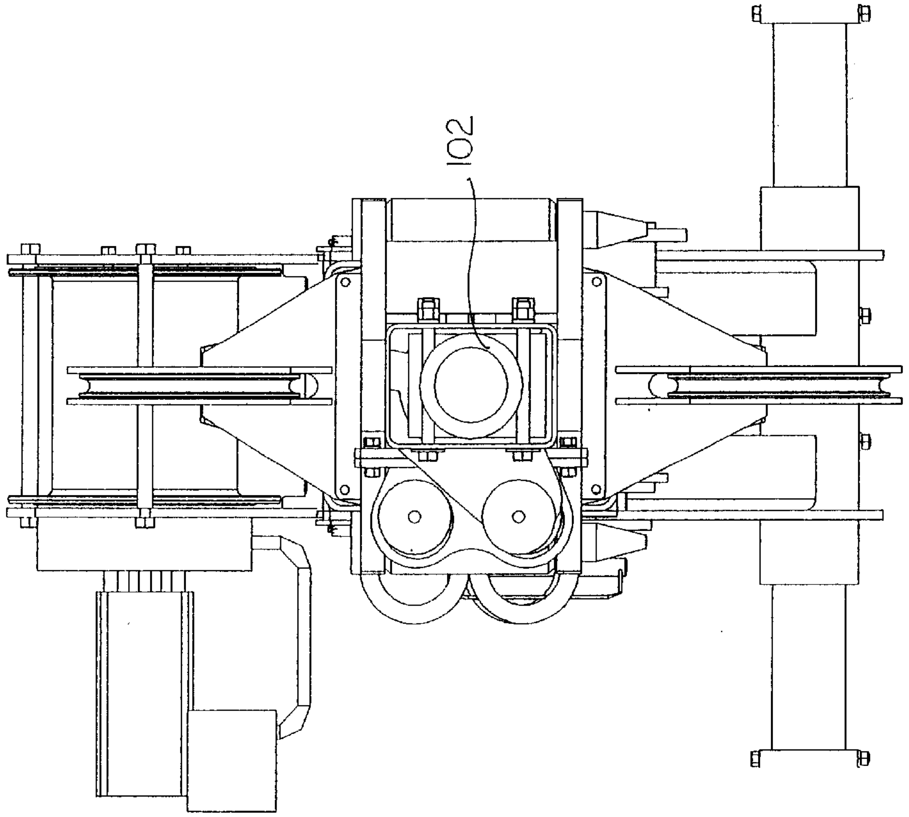
FIG. 12B is a view similar to FIG. 12A except that the extension boom assembly has been pivoted to its extended position.
Figure 12A:
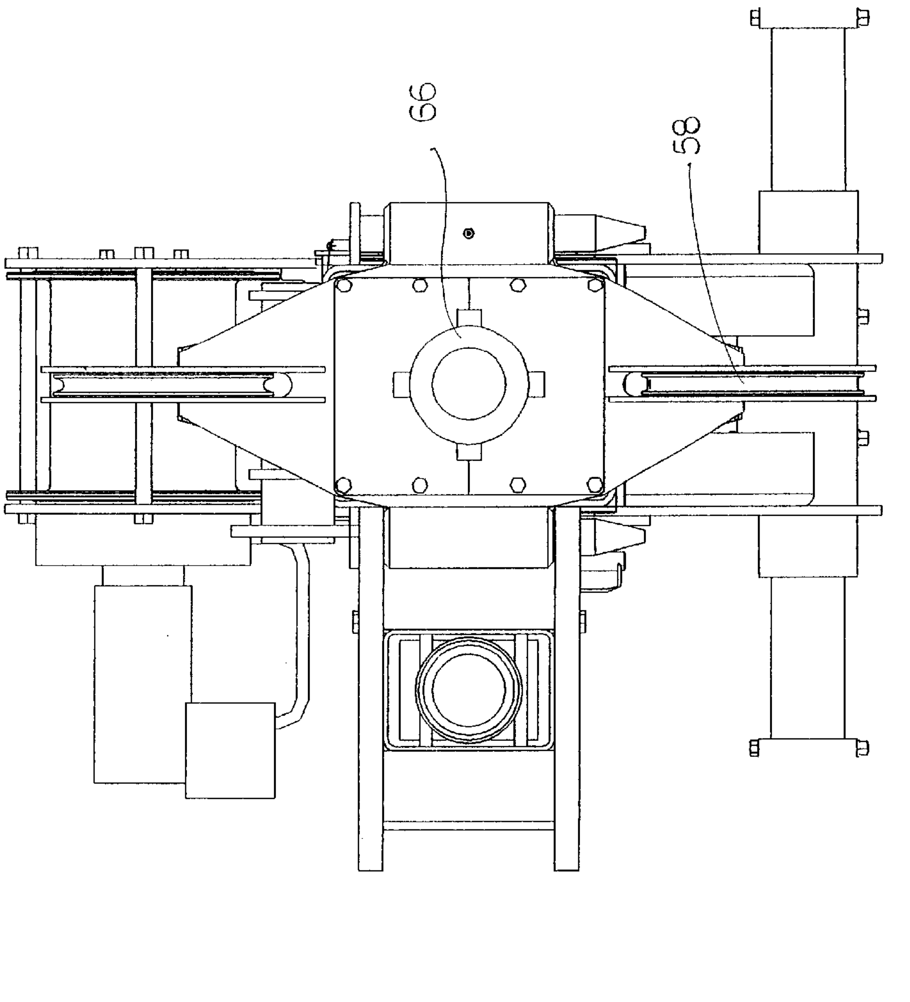
FIG. 12A is an end view of the boom assembly with the extension boom boon in its folded position.
Figure 13:
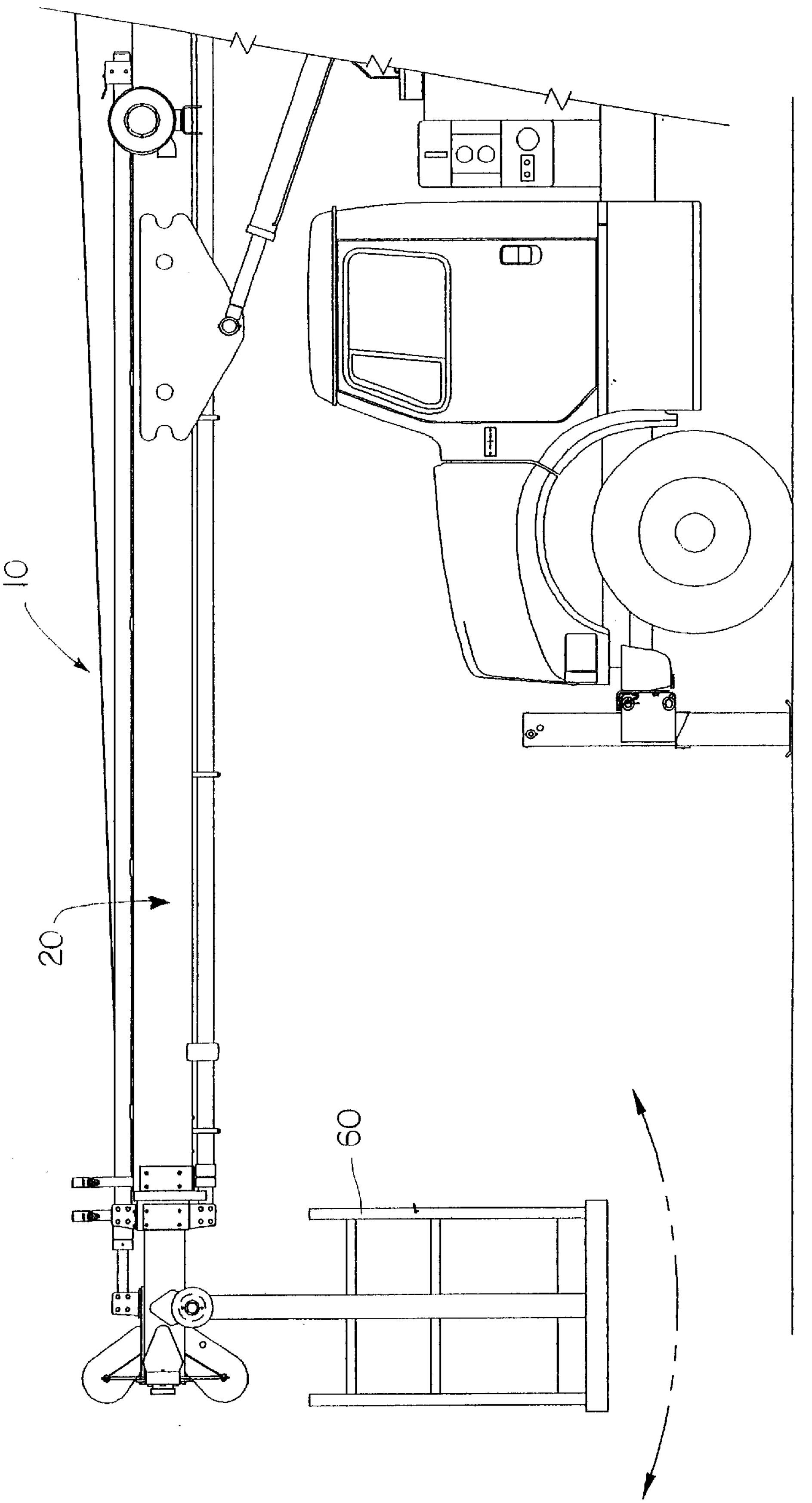
FIG. 13 is a partial side view of the apparatus illustrating a basket being supported by the outer end of the boom assembly.
Figure 14:
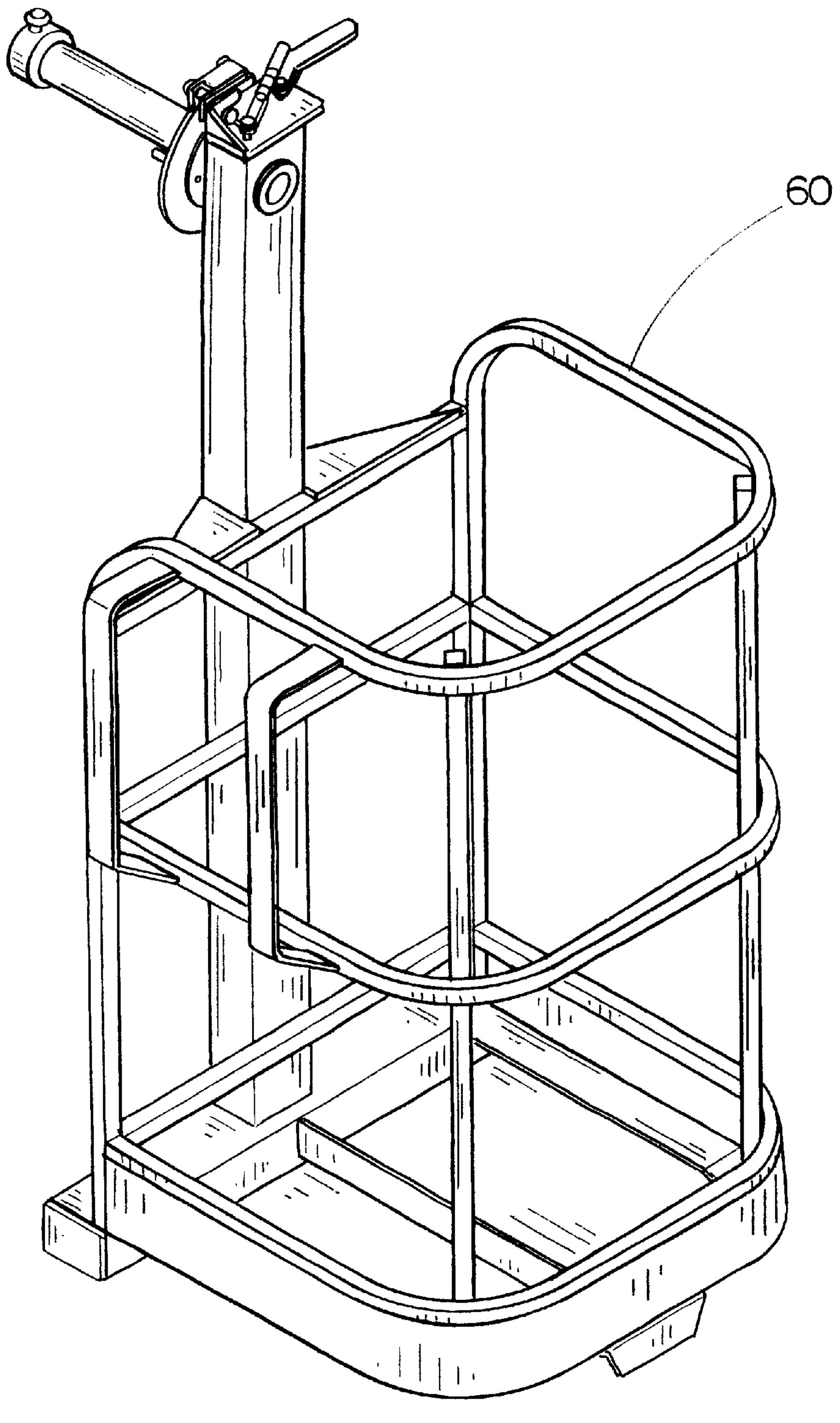
FIG. 14 is a perspective view of the aerial platform which is mounted on the outer end of the boom assembly.

A conduit 102 is positioned in the interior of extension boom 76 and has its intake end 104 positioned between the yokes 78 and 80, as seen in FIG. 9. The discharge end 106 of conduit 102 is positioned outwardly of the end of the extension boom 76, as seen in FIG. 10A. If the apparatus is going to pump concrete without utilizing the extension boom 76, an elbow 108 is inserted into the discharge end 66 of conduit 62 with a flexible hose 110 being connected thereto so that concrete may be easily directed into a form 112, as illustrated in FIG. 1. If the extension boom 76 is to be utilized, elbow 108 is removed from discharge end 66 of conduit 62. Pin 84 is then installed in yoke 78, collar 86, and yoke 80. The inner boom section 40 is then partially extended so that arms 90 and 90' clear the receiver 92 and so that the arm 94 clears the receiver 96. Extension boom 76 is then pivotally moved from its folded position illustrated in FIG. 9 to its extended position illustrated in FIGS. 11A and 11B. When the extension boom 76 has been pivoted so to be in an end-to-end relationship with boom assembly 20, pin 82 is extended through yoke 78, collar 88, and yoke 80, which not only maintains extension boom 76 in its operative position, but also places the intake end 104 of conduit 102 in communication with discharge end 66 of conduit 62. Flexible hose or the like is then secured to discharge end 106 of conduit 102 to aid in placing concrete within the concrete form.

The use of the extension boom 76 gives the apparatus much greater reaching capabilities than if the extension boom were not provided. Further, when the extension boom 76 is in its folded position, the boom assembly 20 may be used in conventional fashion. Thus, an apparatus has been provided which serves a dual purpose, that is, as a concrete pumper or as a conventional crane, depending upon whether the extension boom is being utilized. The provision of the aerial platform 60 enables an operator to spray or pump concrete from the hose 110.

When it is desired to discontinue the concrete pumping action through the extension boom 76, pin 82 is removed from yoke 78, collar 88, and yoke 80. The extension boom 76 is then folded to its folded position adjacent boom assembly 20. The boom assembly 20 is then retracted to cause the arms 90 and 90' to be received by the receiver 92 and to cause the arm 94 to be received by the receiver 96. Pin 100 would then be extended through the receiver 96 and the arm 94 to maintain the extension boom 76 in its folded position. The pin 84 is then removed from yoke 78, collar 86, and yoke 80. The intermediate boom section 38 and the inner boom section 40 would then be retracted, which will cause the conduit 62 in boom assembly 20 to move rearwardly therein. At that time, it is necessary for a worker to pull the flexible hose 32 from the rearward end of the boom assembly 20 and coil the same on the platform 16 of the truck. The retracted boom assembly 20 is then placed upon the support 34.

Thus it can be seen that the invention accomplishes at least all of its stated objectives.

We claim:

1. In combination:

a truck comprising a wheeled frame having rearward and forward ends, and a cab mounted on the forward end of said wheeled frame;

a rotatable pedestal assembly mounted on said wheeled frame rearwardly of said cab;

a telescopic boom assembly, having inner and outer ends, having its inner end pivotally secured, about a horizontal axis, to said pedestal;

a first hydraulic cylinder means pivotally connecting said telescopic boom assembly to said pedestal for pivotally moving said telescopic boom assembly with respect to said pedestal;

said telescopic boom assembly having an interior cavity extending therethrough;

a first, elongated concrete conduit positioned in said interior cavity of said telescopic boom assembly having a discharge end positioned at the outer end of said telescopic boom assembly and having an intake end positioned at said inner end of said telescopic boom means;

said intake end of said first concrete conduit being in communication with a source of concrete under pressure whereby concrete may be pumped through said first concrete conduit in said telescopic boom assembly to said discharge end of said first concrete conduit.

2. The combination of claim 1 wherein a concrete pump is positioned on said wheeled frame which is operatively connected to said intake end of said first concrete conduit.

3. The combination of claim 1 wherein said telescopic boom assembly comprises an outer hollow boom section having at least one inner hollow boom section telescopically received therein and wherein said first concrete conduit is positioned in said inner hollow boom section and secured thereto for movement therewith.

4. The combination of claim 3 wherein a second concrete conduit, having intake and discharge ends, has its said discharge end connected to said intake end of said first concrete conduit; said intake end of said second concrete conduit being in communication with the source of concrete under pressure.

5. The combination of claim 4 wherein said first concrete conduit is substantially rigid and wherein said second concrete conduit is flexible.

6. The combination of claim 5 wherein said first concrete conduit comprises a pipe and wherein said second concrete conduit comprises a flexible hose.

7. The combination of claim 6 wherein said flexible hose is pulled into said inner end of said telescopic boom assembly when said inner boom section is telescopically moved outwardly from said outer boom section.

8. The combination of claim 7 wherein said source of concrete under pressure comprises a concrete pump having a discharge side connected to said flexible hose.

9. The combination of claim 8 wherein said concrete pump is positioned on said wheeled frame.

10. The combination of claim 1 wherein said telescopic boom assembly comprises an outer hollow boom section having an intermediate hollow boom section telescopically mounted thereon and an inner hollow boom section telescopically mounted in said intermediate boom section; each of said boom sections having inner and outer ends; said first concrete conduit extending through the interiors of said boom sections.

11. The combination of claim 10 wherein said first concrete conduit is fixed within said inner boom section for movement therewith.

12. The combination of claim 11 wherein a flexible concrete conduit extends between said intake end of said first concrete conduit and said source of concrete under pressure.

13. The combination of claim 12 wherein said flexible concrete conduit is pulled into the interior of said boom assembly as said intermediate and inner boom sections are moved outwardly with respect to said outer boom section.

14. The combination of claim 13 wherein a conduit guide means is mounted at said inner end of said boom assembly for guiding said flexible concrete conduit as it is moved with respect to said boom assembly.

15. The combination of claim 10 wherein an auxiliary hollow extension boom, having first and second ends, is selectively pivoted at its said first end to the outer end of said inner boom section; said extension boom being pivotally movable from a folded position adjacent said boom assembly wherein said extension boom is substantially parallel to said boom assembly along one side thereof to an extended position wherein its said one end is positioned in an end-to-end relationship with respect to said inner boom section to form an extension of said boom assembly; said extension boom having an extension concrete conduit therein having an intake end which is in communication with said discharge end of said first concrete conduit when said extension boom is in its said extended position and having a discharge end which is positioned at said second end of said extension boom.

16. The combination of claim 15 further including means for securing said extension boom to said outer boom section when said extension boom is in its said folded position.

17. The combination of claim 16 wherein said means for securing said extension boom to said outer boom section also includes a locking means to prevent longitudinal movement of said extension boom with respect to said outer boom section.

18. The combination of claim 15 further including means for disconnecting the pivotal connection of said extension boom to said boom assembly when said extension boom is in its said folded position.

19. The combination of claim 1 wherein an aerial platform is mounted on said telescopic boom assembly.

* * * * *